United States Patent [19]

Perreau

[11] 3,752,568
[45] Aug. 14, 1973

[54] COLOR MOTION-PICTURE PROJECTION SYSTEM

[75] Inventor: Pierre Perreau, Paris, France

[73] Assignee: Schlumberger Instruments Et Systemes, Paris, France

[22] Filed: Oct. 28, 1971

[21] Appl. No.: 193,407

[30] Foreign Application Priority Data
Oct. 28, 1970 France .................................. 38827

[52] U.S. Cl. .................... 352/66, 352/119, 351/213
[51] Int. Cl. .......................................... G03b 33/00
[58] Field of Search...................... 352/66, 119, 213

[56] References Cited
UNITED STATES PATENTS
| | | | |
|---|---|---|---|
| 1,204,771 | 11/1916 | Hopkins.............................. | 352/119 |
| 2,215,464 | 9/1940 | Dorgelo ............................. | 352/109 |
| 3,690,752 | 9/1972 | Derossi ............................. | 352/137 |
| 2,138,846 | 12/1938 | Fairall................................. | 352/66 |

FOREIGN PATENTS OR APPLICATIONS
569,407  1/1924  France
995,589  8/1951  France

*Primary Examiner*—Samuel S. Matthews
*Assistant Examiner*—Monroe H. Hayes
*Attorney*—William R. Sherman, Jerry M. Presson et al.

[57] ABSTRACT

Color motion-picture projection system of the additive synthesis type.

For each multicolor image of the original film, the black and white film used has a given number of selected single-color images following one another in a uniform order of color. A synchronizing mark is placed at each image of a given color. The projector has a single lens, a capstan to drive the black and white film continuously, a multiple face prism provided with colored coatings driven by a motor. The rotation of the capstan is servo-controlled to that of the prism. The projection is stable and the images are projected by means of a suitable colored light.

Compared with a direct multicolor film projection system, cost is considerably reduced and projection is of comparable quality.

1 Claim, 4 Drawing Figures

COLOR MOTION-PICTURE PROJECTION SYSTEM

The present invention relates to a color motion-picture projection system.

It is known that in color motion-pictures it is possible to use so-called additive multi-color synthesis processes. Such processes have for example been described in French patent No. 569,407 and U.S. Pat. No. 2,161,126. In such processes, a selection of single-color images is first of all made by successively photographing the scene to be filmed through several colored filters furnishing bands of colors such as blue-violet, green and medium red, in three color processes, which bands cover approximately all the visible spectrum; this gives selected images reproduced in black and white corresponding respectively to the color bands. Then a multi-color reproduction of the initial scene is made by additive synthesis, by projecting, in colored light adapted to each, the images reproduced in black and white selected during the filming, either simultaneously by means of at least two objectives, or in sufficiently rapid succession through a single objective. Such processes can theoretically by performed in two colors, in three colors and in four colors. These processes have not been very successful up to the present. The cause of this failure is attributable to the fact that the projections achieved are of too poor a quality compared to those obtained by means of multi-color films; this mediocrity is due in particular to the difficulties associated with the rapid advance of the film and with the syncronisation of the colored lights and the single color images reproduced in black and white.

An essential object of the invention, starting from this known area, is to provide a color motion picture projection system using a black and white film in an additive multi-color synthesis process, whose qualities are comparable to those of a direct multi-color projection system, the cost of the film and of the projection apparatus used being thereby greatly reduced. This is intended to facilitate the extension of color-motion pictures, in particular for the needs of industry, teaching, documentation, leisure, both in the professions concerned and in the general public.

To this end, in accordance with the invention, a color motion picture projection system of the additive synthesis type such as defined above is characterised essentially by the fact that the said projection apparatus comprises a single objective, means for making the black and white film move continuously, means for adapting the color of the projection light to each selected image and means for stabilizing the projected pictures in spite of the continuous movement of the film, the arrangement being such that the selected images corresponding to a given band of colors are projected at least 36 times per second.

In effect, in a motion-picture projection system of the multi-color additive type, in order for the eye to have the impression of multi-color pictures, it is sufficient for each selected color to pass about twenty times per second, but in this case a flickering impression remains which is unpleasant for the viewer. Systematic experiments conducted by the applicant have shown that in order to eliminate this flickering impression, it is necessary to have a speed at least about twice as high.

A study of the phenomena involved shows that in this type of projection an optical effect resulting from diffraction is involved whereby a light form on a black background appears larger than this same form on a light background. In the case, for example, where the subject is a red disk on a green background, selection through a red filter will give a light disk on a black background whereas the following selection through a green filter will give a black disk on a light background. Thus, during the alternating projection of these images, an effect is produced which, at low frequency, shows the viewer a disk which changes diameter with each image. Above 36 projections per second, this phenomenon is practically not detectable. It is totally eliminated after 40 projections per second. By using a continuous film movement (instead of the usual maltese cross drive) and means for stabilizing the projected image, film driving problems are completely overcome in spite of the high speeds required.

According to another characteristic of the invention, the black and white film used is made from a multi-color original film. Due to this feature, the images of the same sequence are obtained by photographing fixed images. In this manner, the time parallax is eliminated which would otherwise be translated by colored fringes during rapid movement.

The invention will be better understood through the following description of embodiments of the black-and-white film and of the projection apparatus in accordance with the invention, with reference to the accompanying drawings in which.

Figure 1A:
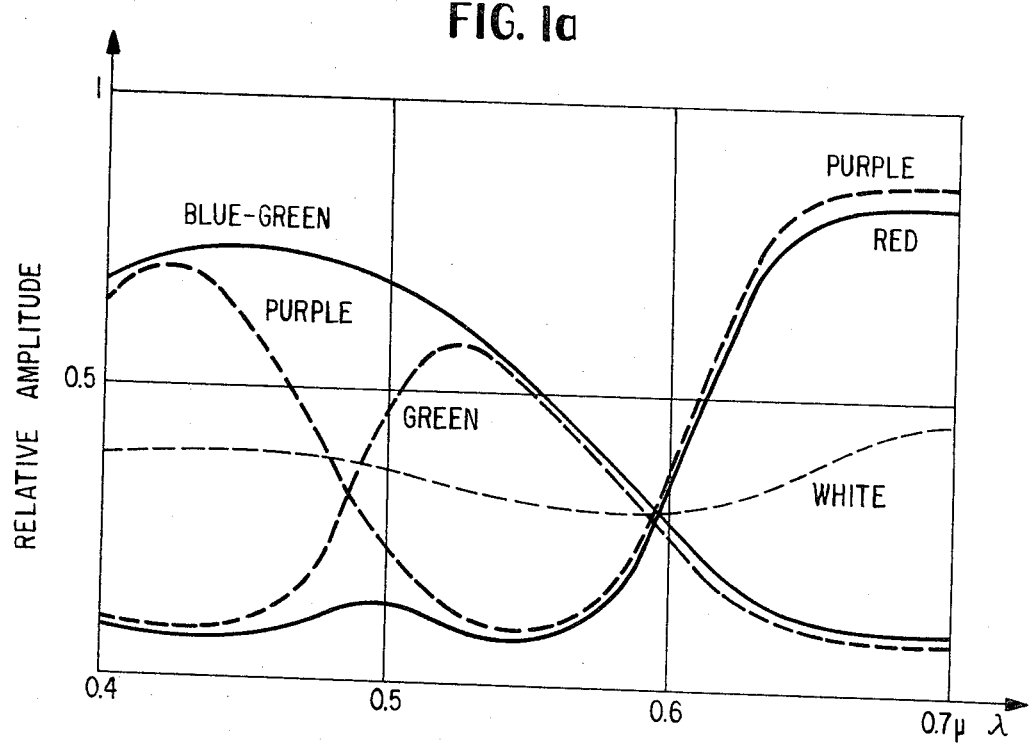
FIGS. 1a and 1b represent the passbands of the color filters to be used in the devices in accordance with the invention.

FIG. 1a represents the passbands of the blue-green (or cyan) and medium red filters utilizable in two-color projection (unbroken lines) and those (long dotted lines) of purple filters (red-violet) and medium green which must be added to the two preceding ones for four-color projection. A dotted line (small dots) represents the spectral characteristic curve of the light obtained by the additive synthesis of the above four filtered lights. In two-color projection with only the cyan and medium red filters, we would have an amplitude depression in the zone of intersection of the two characteristic curves (yellow).

Figure 1B:
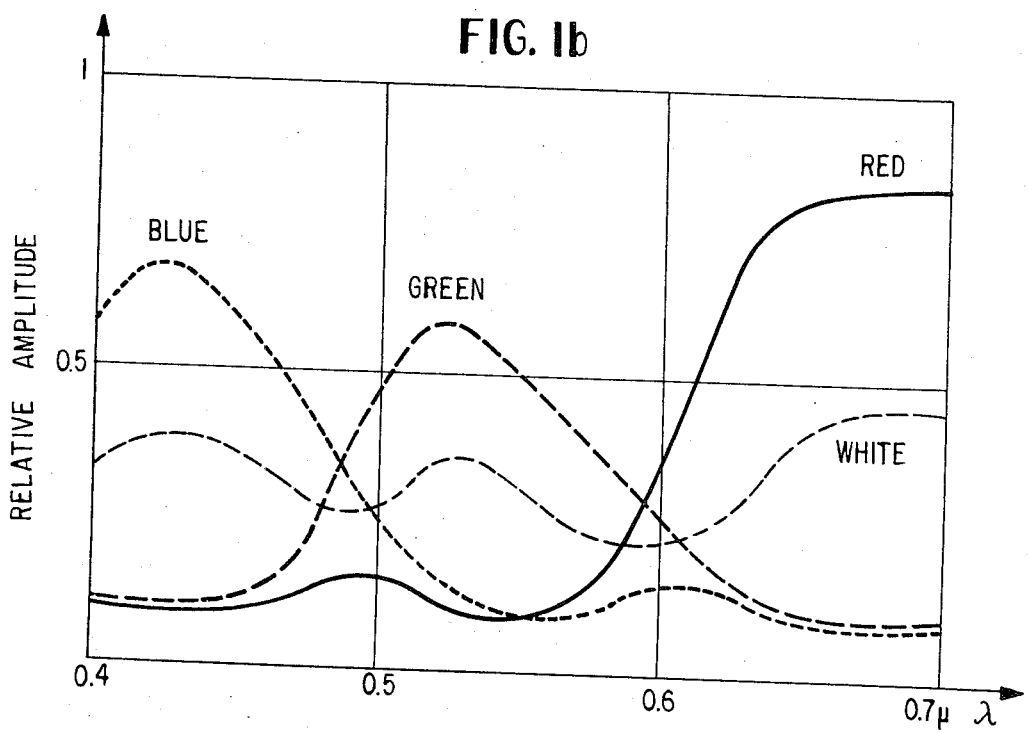

FIG. 1b represents the passbands of three (blue, green and medium red) filters. The synthesis obtained exhibits depressions at the level of the zones where the green crosses with the blue and the red respectively.

According to the invention, it is necessary for the minimum speed at which the successive colors pass to be higher than 36 images per second. In two-color projection — cyan (C) and medium red (R) — this characteristic of the invention is conformed to be replacing each master image of the multicolor film by a sequence of three selected single-color images reproduced in black and white according to a uniform order of colors, the third image of each sequence being identical to the first image. Under these conditions, for two successive multicolor master images, we will have, in black and white, the two following sequences of three selected single-color images: $C_1 - R_1 - C_1 - R_2 - C_2 - R_2$, i.e. three selected cyan images ($C_1$-$C_1$-$C_2$) and red images ($R_1$-$R_2$-$R_2$), which give, with the usual standard of 24 images/second of multicolor film, a projection of 3 × 24/2 = 36 images with identical color bands per second. Two different color bands being used, the total number of images projected per second will be 72.

In three-color projection — medium blue (B), medium green (G) and medium red (R) — the characteristic of the invention is conformed to by replacing each master image of the multicolor film by a sequence of five selected single-color images, reproduced in black and white according to a uniform order of colors, the fourth and fifth image of each sequence being respectively identical to the first and second image. Under these conditions, for three successive multicolor master images (indexes 1, 2 and 3) we will have, in black and white, the 15 following selected images: $G_1 - B_1 - R_1 - G_1 - B_1 - R_2 - G_2 - B_2 - R_2 - G_2 - B_3 - R_3 - G_3 - B_3 - R_3$, i.e. five selected images in green, blue and red, which, with the usual standard gives a projection of 5 × 24/3 = 40 images with identical color bands per second. Three different color bands being used, the total number of images projected per second will be 120.

In four-color projection, the problem is presented in a somewhat different manner. In fact, as seen in FIG. 1a, the passband of the purple filter used contains the totality of the passband of the medium red filter, and the passband of the blue-green (cyan) filter used contains the totality of the passband of the medium green filter. Consequently, there is no flickering when one passes from a cyan selected image to a medium green selected image. The same is true when one passes from a purple selected image to a medium red selected image. To put the characteristic of the invention into practice in four-color projection thus consists of simply selecting in order, for each multicolor master image, four images respectively determined by the four following filters: red - cyan - purple - green. Under these conditions, the three bands of primary colors of the visible spectrum (medium red, medium green and medium blue) are each repeated 48 times per second, although the total number of projected images is only 96 per second.

The use of the four-color process in a motion-picture system according to the invention thus leads paradoxically to a shorter length of film than required in three-color projection. The choice of four-color projection therefore permits, in principle, better spectral quality of the reproduced images and also a reduction in the cost and in the film length.

Figure 2:
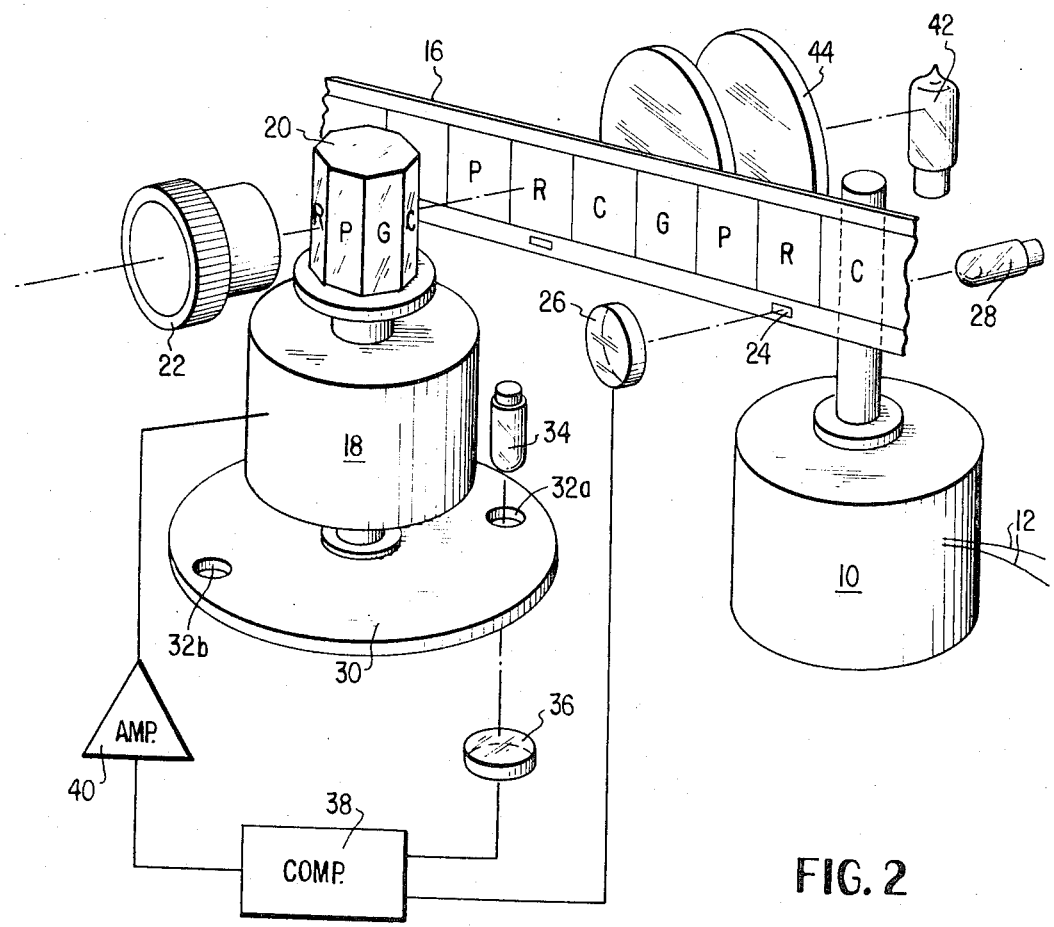
FIG. 2 is a simplified diagram of a projection apparatus in accordance with the invention.

FIG. 2 shows a film drive and image stabilizing device according to the invention. Certain known parts of the projection apparatus (sound reproduction unit, reels-magazines, etc.) have not been shown for the sake of simplicity. The device of FIG. 2 has a synchronous motor 10 supplied at 12 by a constant frequency voltage source, 50 Hz or 60 Hz mains for example. The motor 10 drives the film 16 via a capstan 14. A D.C. motor 18 drives a multiple face prism 20 placed between the focusing optics 22 and the film 16. The number of prism faces in four-color projection is a multiple of four, eight or 12 for example. In three-color projection, this will be an even multiple of three, for example six or 12. The faces of the prism 20 have transparent colored coatings R – C – P – G respectively, constituting color filters preferably identical to those used during the selection of single-color images. In practice, these coatings will be either glued films, or multilayer deposits constituting interference filters. These colored coatings are of course placed on the faces of the prism 20 in the same order as the selected single-color images reproduced in black and white on the film 16. Under these conditions, the faces of the prism 20 being of an even number, the opposite faces of the prism have coatings of the same color.

Opposite the images of the film 16 corresponding to a particular band of colors, an optical mark such as 24 is provided. A photo-electric detector 26 associated with a lamp 28 generates a pulse $I_1$ whenever a mark 24 passes in front of it. On the other end of the shaft of the motor 18 is fixed an opaque disk 30 having two diametrically opposite peripheral slots 32a and 32b aligned with the colored coatings of the prism 20 corresponding to the single-color images of the film 16 marked by the optical marks 24. A light source 34 and a photo-electric detector 36 are associated with the disk 30. It will be noted that a magnetic detection device may be used instead of a photo-electric detection device.

At the output of the detector 36 appear the pulses $I_2$. After amplification and shaping (in circuits not shown), the pulses $I_1$ and $I_2$ are applied to a phase comparator 38 adapted to deliver a positive or negative D.C. error signal whose amplitude is proportional to the relative phase shift of the pulses $I_1$ in relation to the pulses $I_2$ taken as a reference. The error signal amplified at 40 is applied to the D.C. motor 18 driving the prism 20.

Owing to this arrangement, the pulses $I_2$ and $I_1$ are synchronized and the prism 20 rotates at a speed which is constantly controlled by the speed of advance of the film 16. Thus the light beam in the form of band produced by a lamp 42 and a light condenser 44 passes through the images of the advancing film 16 and is then refracted in the prism 20 driven by the servo-controlled motor 28 in the reverse direction to the direction of advance of the film; and light beam is then applied to the projection objective 22. Under these conditions, a stable picture is projected in spite of the continuous advance of the film 16. Moreover, because of the coincidence of the marks 24 and the slots 32 with the same band of colors, on the one hand, and of the suitable setting of the detectors 24 and 36 in relation to the faces of the prism 20, on the other hand, each single-color image assigned to a given band of colors, reproduced in black and white on the film 16, is projected by means of a colored light beam adapted to the said given color band. Such a beam is in fact obtained by the passage of white light emitted by the lamp 42 of the projector through the two coatings of the same color R, C, P or G, placed on two faces opposite the prism 20 which correspond to the band of colors assigned to the single-color image projected at that instant.

Such a projector/film arrangement constitutes a motion-picture projection system of the multicolor additive type which possesses qualities comparable to those of a direct multicolor projection system, but which is also particularly economical. In fact, a relatively slight modification in the usual projector (about 20 percent increase over the price of such a projector), is sufficient to allow the use of very inexpensive black-and-white film, to make a quality color projection.

A type of black-and-white film that is particularly well suited to this invention is the film produced by the American firm Metro-Kalvar. It will be mentioned briefly that the Metro-Kalvar film uses a phenomenon of light dispersion in a thickness of thermoplastic resin covered on one side with transparent polyester, the exposure being made in ultraviolet light and the development by simple thermal processing.

It will be noted that the arrangement of the colored coatings on the faces of the turning prism constitutes a particularly advantageous combination of the means for stabilizing the projected image and the means for adapting the color of the light to the selection color of the black-and-white image of the film. The separation of these means is of course theoretically possible in spite of the complexity of the projector which would result therefrom.

Figure 3:
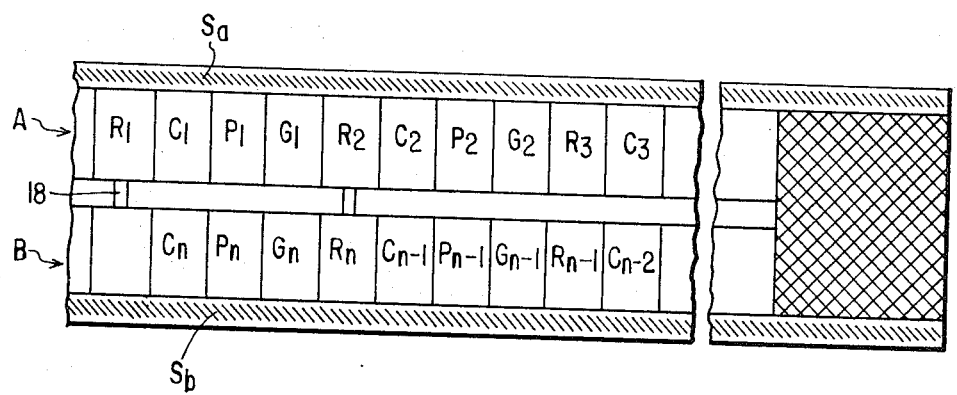
FIG. 3 represents the ends of a film according to the invention.

FIG. 3 shows the two ends of a four-color film according to the invention. Such a film is double and has two picture tracks A and B for images $R_1 - C_1 - P_1 - G_1 - R_2$ - etc. and $R_{n-1} - G_{n-1} - P_{n-1} - C_{n-1} - R_n$ etc. which succeed one another respectively from left to right and from right to left. With each of these picture tracks is associated an optical or magnetic sound track, $S_a$ and $S_b$.

To make such a film, one begins with an original multicolor film. This film is cut into two parts of equal length which are set side by side at the moment of the selection of the single-color images such that the beginning and the end of the original film are placed side by side. The two original half-films thus juxtaposed are then simultaneously reproduced by four-color selection so as to produce the two tracks A and B of the black-and-white film according to the invention. At the centre is disposed a synchronization track bearing the optical marks 24 (transparent rectangles) of FIG. 2. The right-hand end of the film is opaque.

Under these conditions, no projection is possible when this end is engaged in the projection optics. Moreover, in such a case, the optical mark detector 26 (FIG. 2) does not deliver any signal. Such a prolonged absence of a signal may be easily detected for example by means of a low-pass filter followed by a threshold trigger, associated with a latching electromagnetic relay. The contacts of this relay will be connected such that the rotating direction of the synchronous motor 12 and then, owing to the servo-control, that of the motor 18 are reversed when the said relay is supplied, whereas the position of the film in front of the focusing and projection optics is shifted, the track B being substituted for the track A, and the reproducing head assigned to the sound track $S_a$ is replaced by that assigned to the track $S_b$. The result is that the direction of the succession of the colored coatings mounted on the prism 20 is reversed, as is the direction of movement of the film 16. The synchronizing of film speed with that of prism rotation is of course maintained. The time required for the automatic reversal of these rotation and film movement directions is 2 to 3 seconds. During this time, there is no projection. The disadvantage that such an interruption represents is minimal compared to the advantage of doubling the duration of projection by doubling the thickness of the film reel. In practice, it will be possible to use images of the "Super 8" type which are about 4 mm high and about 5.5 mm wide. Under these conditions, a film reel according to the invention giving a projection of one hour ( one half-hour for each half film) will have a length of 700m and a width of 15 mm. With a film 30-$\mu$ thick, one obtains a reel of 19-cm diameter weighing 800 grams. Such a film can thus be easily sent in the mail which facilitates considerably its commercial distribution. Moreover, by using the Metro-Kalvar reproduction process, the cost of such a reel will be four to five times lower than that of a multicolor Super 8 film reel of the same duration.

I claim:

1. Color motion picture projection apparatus of the additive synthesis type, in which images obtained by selection by means of several colored light filters and reproduced one after another in a determined order of colors on a black and white film are successively projected in light of a color band adapted to each image, the black and white film having reference marks in predetermined registration with the images, said apparatus comprising: a first motor for continuously advancing the film; a source of white light and an objective lens on the same optical axis; a multiple face prism being disposed on said optical axis and driven in rotation by a second motor, the number of said faces being an even multiple of the number of colored light filters used for selecting the single color images reproduced in black and white on said film, the opposite faces of said prism being provided with transparent colored coatings which are preferably identical, said coatings being respectively determined by filters used for making the film and respectively disposed on said faces in the uniform order of selection of the colors; a support rigid with the shaft of said second motor and comprising reference marks for indicating the angular position of the coatings of a given color of the prism; a first means for detecting the reference marks borne by the film facing each image corresponding to a particular color band; a second means for detecting the reference marks indicating the coatings of the prism; and a phase comparison circuit to which are applied the signals respectively generated by said first and second detection means, said phase comparison circuit delivering an output signal used for synchronizing the rotation of said first and second motors.

* * * * *